Jan. 10, 1961     H. A. MAIER     2,967,456
CAMERA ATTACHMENT FOR MICROSCOPE
Filed May 28, 1959     2 Sheets-Sheet 1
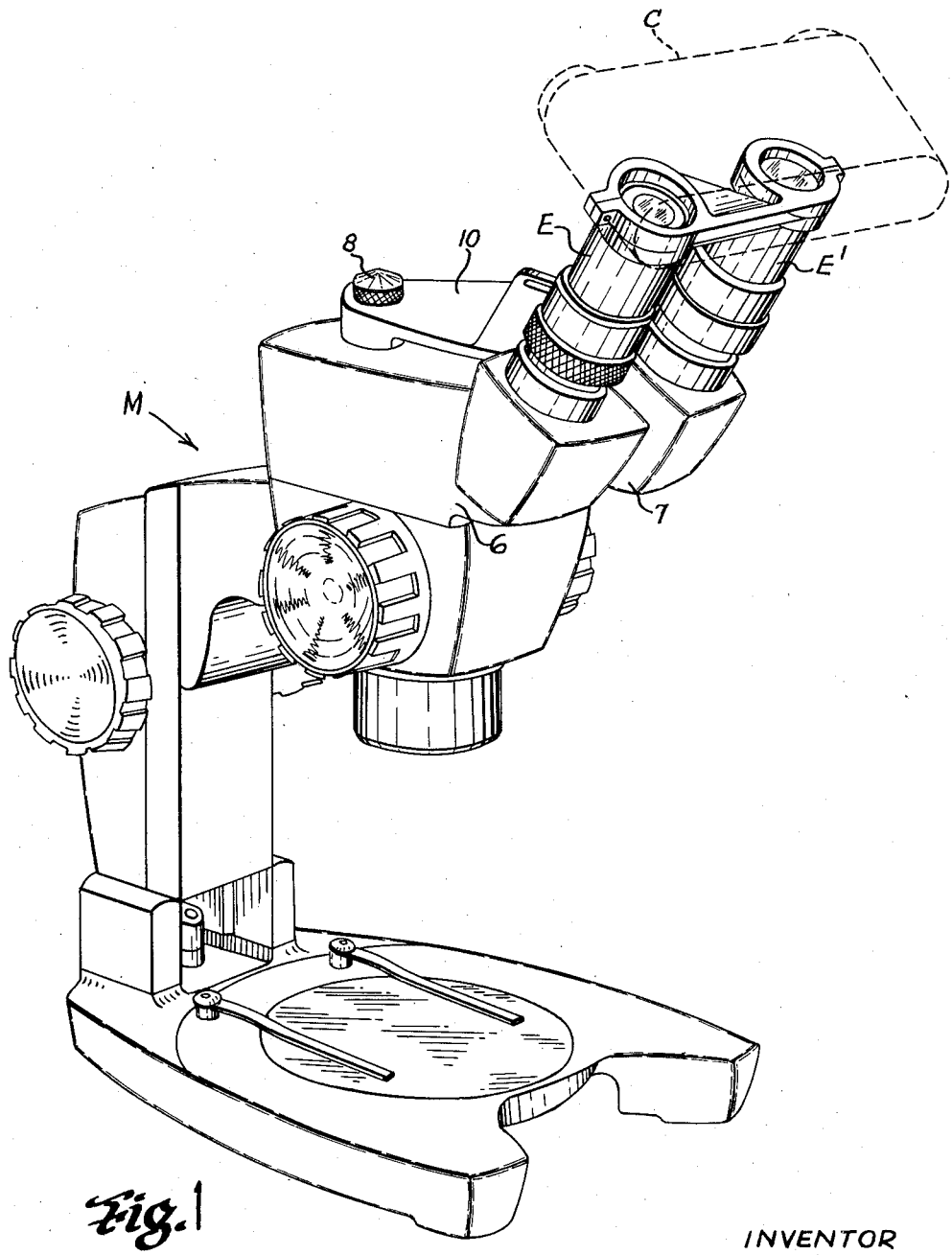
INVENTOR
HOWARD A. MAIER
BY
Herbert C. Kimball
ATTORNEY

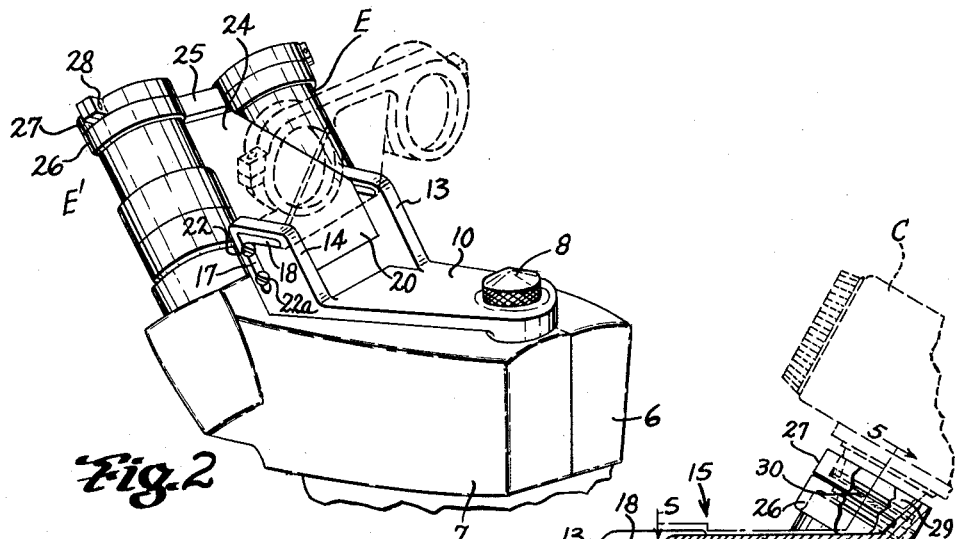
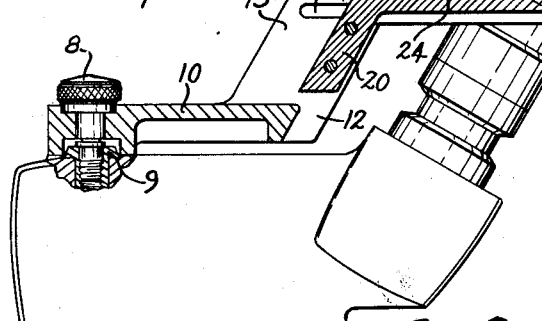
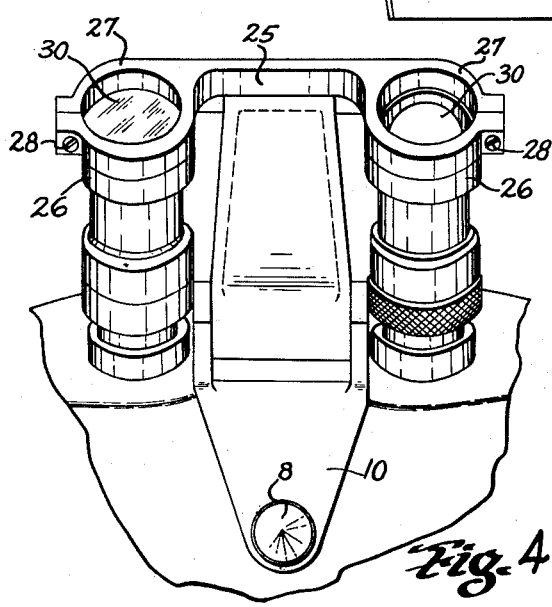
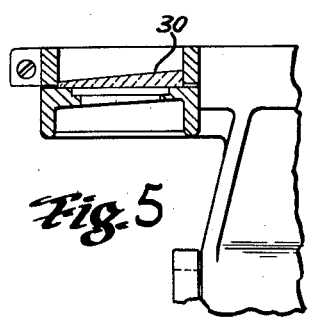

United States Patent Office 2,967,456
Patented Jan. 10, 1961

2,967,456

CAMERA ATTACHMENT FOR MICROSCOPE

Howard A. Maier, Williamsville, N.Y., assignor to American Optical Company, Southbridge, Mass., a voluntary association of Massachusetts Filed May 28, 1959, Ser. No. 816,438

6 Claims. (Cl. 88—24)

This invention relates to an adapter for mounting a stereo camera on a stereoscopic microscope so that the camera may be swung to operative position for photographing through the eyepieces of the microscope, and may be swung back to inoperative position to permit the observer to use the microscope. It is not sufficient that the camera be swung into alignment with the eyepieces, because unless the camera is in light-tight relation with the eyepieces the operator does not have complete control of the light condition in the camera. The present invention provides such a light-tight relation which promotes time exposures of film where the images are not brilliantly illuminated.

In the drawings which illustrate the invention:

Fig. 1 is a perspective view of a stereoscopic microscope to which an adapter embodying the present invention has been applied;

Fig. 2 is a perspective view of the two prism housings and the two eyepieces of the microscope together with the adapter, the view being taken from the rear of the microscope;

Fig. 3 is a view in side elevation of a prism housing and an eyepiece of the microscope, together with the adapter, the latter being shown principally in section;

Fig. 4 is a plan view of the prism housings, eyepieces and adapter shown in Fig. 2, and Fig. 5 is a view partially in section on the line 5—5 in Fig. 3.

In observing an object by means of a stereoscopic microscope the fusional faculty is called into play so as to bring "depth" into the mental impression. As is known, this "depth perception" or three-dimensional viewing arises out of and is dependent upon the slight difference between the images as seen by the two eyes. A person's eyes are spaced apart, and one eye sees a neighboring object from a different angle from that at which the other eye sees the same object. So in a stereoscopic microscope the optical axes of the lens systems, including the eyepieces, which produce for the observer the highly magnified images of the object converge toward the same point in the object. It is of assistance to the average person in "fusing" the two stereoscopic images of such a microscope if the eyepieces provide an angle of convergence of approximately 2½ degrees.

Now a stereo camera adds to the two optical systems of the microscope two further optical systems, namely, the two camera objectives. For the stereo camera, the above angle of convergence of 2½ degrees results in excessive convergence. To obtain desirable results when using a stereo camera to photograph what is observed through the eyepieces of a stereoscopic microscope, it is important to neutralize in part or entirely the above convergence of the optical axes by using a base-in prism in connection with each eyepiece of the microscope.

An adapter for mounting a stereo camera on a microscope in accordance with the present invention provides for the foregoing considerations, and leaves the microscope available for customary use by an observer so long as the adapter is swung to inoperative position, yet connects the camera in light-tight relation with the two eyepieces of the microscope when the adapter is swung to operative position.

For fixing the adapter on the microscope M, a stud bolt or screw 8 is engaged in a threaded opening tapped into the top of the hinge pin 9 on which the prism housings 6 and 7 of the microscope pivot. This element 8 secures the base 10 of the adapter in fixed position overlying the prism housings 6 and 7. A forwardly and upwardly projecting bifurcated bracket 12 is slotted to receive pins projecting laterally from the carrier 15 which swings from the operative position shown in full lines in Fig. 2 to the inoperative position shown in broken lines in the same figure. Each of the arms 13 and 14 of the bracket 12 has a slot made up of a portion 17 generally parallel to the axis of the adjacent eyepiece E or E', and a communicating portion 18 which is horizontally disposed and extends away from the eyepiece.

The carrier 15, which in general is a wide thin element shaped like a dog leg, has a lower and rear portion 20 having a pair of projecting pins 22, 22a on each side as above referred to. It will be clear from Fig. 2 that when the pins 22 and 22a are in the slot portion 17, the lower portion 20 of the carrier is parallel to the axes of the eyepieces E, E', and when the pins 22 and 22a are in the slot portion 18, the lower portion 20 of the carrier is horizontal, and that the pins 22, 22a will readily slide from slot portion 17 to slot portion 18.

The upper and forward portion 24 of the carrier 15 is at an angle to the lower portion 20 as above referred to, so that the forward end of the portion 24 when in operative position is adjacent the eyepieces E and E' as shown in Fig. 3. This forward end of the portion 24 is in the form of a yoke 25 carrying two pairs of cups, one pair for each eyepiece of the microscope M. One cup 26 of each pair faces inwardly and slides into place over the respective eyepiece E or E' as the pins 22, 22a move along the slot portions 17. It will be noted from Fig. 5 that the convergence of the eyepieces E and E' amounting to about two and a half degrees for each eyepiece requires that the recess in the cup 26 be canted by the same amount. In this way when each cup is telescoped over its respective eyepiece, the rim of the latter seats accurately in the canted recess to provide light-tight engagement with the cup. The other cup 27 of each pair faces outwardly. This is a split cup having a screw 28 for clamping the cup about one objective housing 29 of the stereo camera C. In each of the cups 27 is disposed a base-in prism 30 for neutralizing in part or entirely the convergence due to the customary angular relation between the optical axes of the two eyepieces E and E'. For the typical arrangement and design of stereoscopic microscope eyepieces I use a four diopter base-in prism in each cup 27.

Assuming that a stereo camera C has its two objective housings 29 gripped by the two cups 27 on the yoke 25, the carrier 15 of the adapter affords the operator a choice of positions for the camera C. By sliding the two sets of pins 22, 22a, one set on each side of the portion 20 along the slots 17 and 18 in the bracket 12, the carrier may be moved to or from inoperative position. Moreover, because the slot portion 17 is parallel to the eyepieces E and E', the cups 26 telescope down over the eyepieces E, E' as the camera approaches and moves into operative position. These cups 26 lift away from the eyepieces E, E' when the reverse movement toward inoperative position is initiated.

It will be appreciated, therefore, that by the use of an adapter embodying the present invention, the necessary motions are appropriately guided and controlled for bringing a stereo camera alternatively into light-tight relation to a stereoscopic microscope and to inoperative position.

Moreover, because the eyepieces E and E' seat accurately in the cups 26, the camera is so accurately positioned as to be parfocal with the optical system of the microscope. This is of importance because it enables the user to observe the subject while focusing the microscope, and then swing the camera to the position shown in Fig. 3 with the assurance that the camera is now parfocal and that two clear focused pictures will result when the shutters of the camera are actuated.

I claim:

1. A device for mounting a stereo camera having a pair of objective housings on a stereoscopic microscope having a pair of eyepieces comprising a base with a bracket projecting therefrom, said base being adapted to be secured to the microscope, a carrier for the camera, cooperating guiding means on said carrier and bracket, a portion of said guiding means requiring initial lifting movement of said bracket and camera away from operative relation to said microscope eyepieces in a direction generally parallel to the optical axes of said eyepieces, an additional portion of said guiding means permitting swinging movement of said bracket and camera to inoperative position only after said initial lifting movement is completed, a yoke on said carrier supporting a pair of communicating cups for each eyepiece of the microscope, one cup when in operative position facing outwardly away from the microscope eyepiece for receiving and retaining an objective housing of the camera and the other cup facing inwardly for telescoping over the respective eyepiece of the microscope.

2. A device for mounting a stereo camera having a pair of objective housings on a stereoscopic microscope having a pair of eyepieces comprising a guide member adapted to be secured to the microscope and a carrier for said camera, said member having guiding slots cooperating with projecting portions of said carrier to control movement of said carrier between operative position of camera with relation to said microscope eyepieces and inoperative position, the initial portions of said guiding slots being parallel to the optical axes of said eyepieces to require initial lifting of said camera away from said eyepieces in a direction generally parallel to the optical axes of said eyepieces and adjoining portions of said guiding slots permitting tilting movement of said bracket and camera only after said initial lifting movement.

3. A device for mounting a stereo camera having a pair of objective housings on a stereoscopic microscope having a pair of eyepieces comprising a carrier for said camera and means adapted to be secured to the microscope for guiding said carrier to and from operative position with said objective housing aligned with said eyepieces, said guiding means having a pin and slot connection with said carrier, a portion of said connection being arranged to guide the carrier and camera mounted thereon for initial lifting movement away from said operative position in a direction generally parallel to the optical axes of said eyepieces and an adjacent portion of said connection being adapted to permit swinging movement of said carrier and camera into inoperative position.

4. A device for mounting a stereo camera having a pair of objective housings on a stereoscopic microscope having a pair of eyepieces comprising a carrier having a pair of mounts for gripping the objective housings of said camera in a light-tight relation, each of said mounts opening into a cup for telescoping with an eyepiece of said microscope, a guide member adapted to be secured to said microscope and having guide slots cooperating with projections on said carrier to bring about initial lifting movement of said cups away from said eyepieces in a direction generally parallel to the optical axes of said eyepieces followed by swinging movement into inoperative position.

5. A device for mounting a stereo camera on a stereoscopic microscope as claimed in claim 2 in which said carrier is provided with a pair of mounts for gripping the objective housings of said camera in a light-tight relation and each of said mounts is aligned with and opens into a cup for telescoping with an eyepiece of said microscope.

6. A device for mounting a stereo camera on a stereoscopic microscope as claimed in claim 3 in which said pin and slot connection includes a pair of pins movable along angularly related portions of a slot, said initial lifting movement being brought about by movement of said pair of pins along a slot portion generally parallel to the optical axes of said eyepieces and said swinging movement being brought about by movement of one of said pins into and along an angularly related slot portion.

References Cited in the file of this patent

UNITED STATES PATENTS 2,290,874     Graff                 July 28, 1942

FOREIGN PATENTS 630,547     Germany             Jan. 22, 1935